(12) United States Patent
Uchida

(10) Patent No.: US 10,353,999 B2
(45) Date of Patent: Jul. 16, 2019

(54) INFORMATION PROCESSING SYSTEM, SERVER APPARATUS, CONTROL METHOD, AND STORAGE MEDIUM

(71) Applicant: CANON KABUSHIKI KAISHA, Tokyo (JP)

(72) Inventor: Takayuki Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/057,410

(22) Filed: Mar. 1, 2016

(65) Prior Publication Data

US 2016/0259770 A1 Sep. 8, 2016

(30) Foreign Application Priority Data

Mar. 2, 2015 (JP) ................................. 2015-040335

(51) Int. Cl.
*G06F 17/00* (2019.01)
*G06F 17/24* (2006.01)
*G06F 17/22* (2006.01)

(52) U.S. Cl.
CPC ........ *G06F 17/243* (2013.01); *G06F 17/2264* (2013.01)

(58) Field of Classification Search
CPC ..... G06F 17/24; G06F 17/2264; G06F 17/243
See application file for complete search history.

(56) References Cited

U.S. PATENT DOCUMENTS

| 8,384,934 | B2 | 2/2013 | Nakahara ..................... 358/1.15 |
| 9,213,684 | B2 | 12/2015 | Lai et al. |
| 2007/0130505 | A1 | 6/2007 | Woods |

(Continued)

FOREIGN PATENT DOCUMENTS

| CN | 101465929 | 6/2009 |
| CN | 103593456 | 2/2014 |

(Continued)

OTHER PUBLICATIONS

Anonymous: "PDF to html5 conversion—Forms and Javascript Java PDF Blog", Sep. 21, 2012 (Sep. 21, 2012), XP055288246, retrieved from the Internet: URL:https://web.archive.org/web/20120921205622/http://blog.idrsolutions.com/2012/01/pdf-to-html5-conversion-forms-and-javascript/ [retrieved on Jul. 13, 2016] *the whole document*.

(Continued)

*Primary Examiner* — Stephen S Hong
*Assistant Examiner* — Marshon L Robinson
(74) *Attorney, Agent, or Firm* — Venable LLP

(57) ABSTRACT

An information processing system is provided that includes a document generation unit configured to generate a form document page by performing overlay process for form information and field data; an acquisition unit configured to acquire attribute information indicating a field attribute of the document when the overlay process is performed; a conversion unit configured to convert the generated form document page into an editable form document page; and a browsing screen generation unit configured to generate data for displaying a browsing screen for browsing and editing the editable form document page, the generated data including at least the attribute information and the editable form document page.

10 Claims, 12 Drawing Sheets

(56) References Cited

U.S. PATENT DOCUMENTS

| | | | |
|---|---|---|---|
| 2009/0109457 A1* | 4/2009 | Koyano | G06F 17/243 358/1.9 |
| 2009/0292984 A1* | 11/2009 | Bauchot | G06F 17/30896 715/234 |
| 2010/0232690 A1* | 9/2010 | Kanatsu | G06F 17/30011 382/165 |
| 2011/0001995 A1* | 1/2011 | Sato | G06F 21/608 358/1.11 |
| 2011/0110604 A1* | 5/2011 | Reddy | H04N 1/38 382/275 |
| 2011/0157224 A1* | 6/2011 | Kaneko | G09G 5/397 345/634 |
| 2012/0063684 A1 | 3/2012 | Denoue et al. | |
| 2014/0188950 A1 | 7/2014 | Hanamoto et al. | 707/821 |
| 2015/0082148 A1 | 3/2015 | Lai et al. | |

FOREIGN PATENT DOCUMENTS

| | | |
|---|---|---|
| CN | 103914508 | 7/2014 |
| JP | 2005-190432 A | 7/2005 |

OTHER PUBLICATIONS

Anonymous: "JavaScript in PDF to HTML5 conversion: Formatting & The Field Object", Aug. 1, 2014 (Aug. 1, 2014), XP055288252, Retrieved from the Internet: URL:https://web.archive.org/web/20140801071228/http://blog.idrsolutions.com/2013/02/javascript-in-pdf-to-html5-conversion-formatting-the-field-object/ [retrieved on Jul. 13, 2016] *the whole document*.

Anonymous: "Eine HTML Datei in Eine PDF Datei konvertieren", Dec. 24, 2014 (Dec. 24, 2014), XP055287864, Retrieved from the Internet: URL:https://web.archive.org/web/20141224091616/http://de.pdf24.org/html-2-pdf.html [retrieved on Jul. 12, 2016] *the whole document*.

Anonymous: "jPDWeb–Java PDF Library to 8 Convert PDF to SVG/HTML5", Feb. 14, 2015 (Feb. 14, 2015), XP055287935, Retrieved from the Internet: URL:https://web.archive.org/web/20150214090451/http://www.qoppa.com/pdfhtml [retrieved on Jul. 12, 2016] *the whole document*.

Anonymous: "PDF to HTML5 Conversion Release Notes: 2013 Releases Go back to main downloads page", 2013, XP055287936, Retrieved from the internet: URL:https://www.idrsolutions.com/jpdf2html5/2013-release-notes/ [retrieved on Jul. 12, 2016] *cf. all updates on forms, for example Oct. 4, 2013, Dec. 20, 2013, Nov. 15, 2013, Aug. 22, 2013, 19/97/2013, Jul. 12, 2013, Jun. 14, 2013, Feb. 23, 2013, Feb. 15, 2013, Feb. 8, 2013, Jan. 11, 2013*.

Anonymous: "Adobe Systems (company): How are xdp forms different from pdf forms and html forms?—Quora", Sep. 2, 2013 (Sep. 2, 2013), XP055288234, Retrieved from the Internet: URL:https://www.quora.com/Adobe-Systems-company-How-are-xdp-forms-different-from-pdf-forms-and-html-forms [retrieved on Jul. 13, 2016] *the whole document*.

European search report dated Jul. 26, 2016, in corresponding EP application No. 16157315.9—12 pages.

Office Action dated Aug. 13, 2018 in counterpart Chinese Application No. 2016-10104689.1, together with English translation thereof.

* cited by examiner

INFORMATION PROCESSING SYSTEM, SERVER APPARATUS, CONTROL METHOD, AND STORAGE MEDIUM

BACKGROUND OF THE INVENTION

Field of the Invention

The present invention relates to an information processing system, a server apparatus, a control method, and a storage medium.

Description of the Related Art

For the purposes of efficiency of business and resource conservation by shifting to paperless systems, the number of corporations replacing information on paper media with document data is increasing. For example, business document for the operation of a company are a frequent target of such systems, and conversion of such document into electronic document is being actively performed because of the particularly high operation costs of outputting such large numbers of pages of document in a basic system. Also, a method of creating form documents (document images) in a PDF format or the like by performing an overlay process for overlaying (applying) field data for form information served as a template of a form document is proposed.

Also, cloud computing systems have started to become widespread as a document for managing business data or performing various types of processing on a server computer side. A user accesses a web page of a cloud server computer via the Internet from a World Wide Web (WWW) browser (web browser) of a client computer and browses electronic form document data on the web page. Further, a process of editing and printing form document data to be browsed according to a work flow is considered.

Japanese Patent Laid-Open No. 2005-190432 discloses a system in which a WWW browser of a client displays a form document image on a document output confirmation screen, displays a correction screen by downloading a correction program if a correction screen button is pressed, and performs the correction of data.

In the system disclosed in Japanese Patent Laid-Open No. 2005-190432, it is necessary to separately download the correction program for displaying the correction screen if the correction is required for a form document page (PDF format) browsed in the document output confirmation screen by the user. Therefore, a system for converting a form document in a PDF format created in the overlay process into a format (for example, scalable vector graphics (SVG) format) that can be easily edited on a WWW browser screen and displaying the converted document is considered so that editing can also be performed in a browsing screen of a document displayed on a WWW browser.

However, attribute information indicating a field attribute of a document is lost in the file of the SVG format obtained by converting a form document page of the PDF format created in the overlay process. For example, "right alignment" is assumed to be set as information about text position alignment in an "amount of money" field indicating an amount of money of each product defined as form information in the form document page of a bill created through the overlay process. As its format, a numerical value is assumed to be separated using "," (comma) after every third digit.

However, if layout information, information about text position alignment, format information, etc. are lost in the form document page of the SVG format obtained by converting the form document page of the PDF format, the following problem occurs. Because the information about the text position alignment is lost even if the SVG file is displayed on the editing browsing screen of a WWW browser as it is and the user changes an amount of money displayed as "10,000" to "9000" in the editing browsing screen, left alignment is performed. In addition, separation by "," (comma) is not performed. That is, in a file of a state in which the layout information, the information about the text position alignment, and the format information are lost, the user is required to manually adjust and edit a position or format of a character string and this is not suitable for an editing operation.

SUMMARY OF THE INVENTION

The present invention provides a system in which layout information or format information can be held and an editing operation can be easily performed even if a document page generated in an overlay process is converted into an editable format on a WWW browser screen.

According to an embodiment of the present invention, an information processing system is provided that includes a document generation unit configured to generate a form document page by performing overlay process for form information and field data; an acquisition unit configured to acquire attribute information indicating a field attribute when the document generation unit perform the overlay process; a conversion unit configured to convert the form document page generated by the document generation unit into an editable form document page; and a browsing screen generation unit configured to generate data for displaying a browsing screen for browsing and editing the editable form document page, the generated data including at least the attribute information and the editable form document page.

According to the information processing system of the present invention, it is possible to hold layout information or format information and easily perform an editing operation even if a form document page generated in an overlay process is converted into an editable format on a WWW browser screen.

Further features of the invention will become apparent from the following description of exemplary embodiments with reference to the attached drawings.

DESCRIPTION OF THE EMBODIMENTS

First Embodiment

Figure 1:
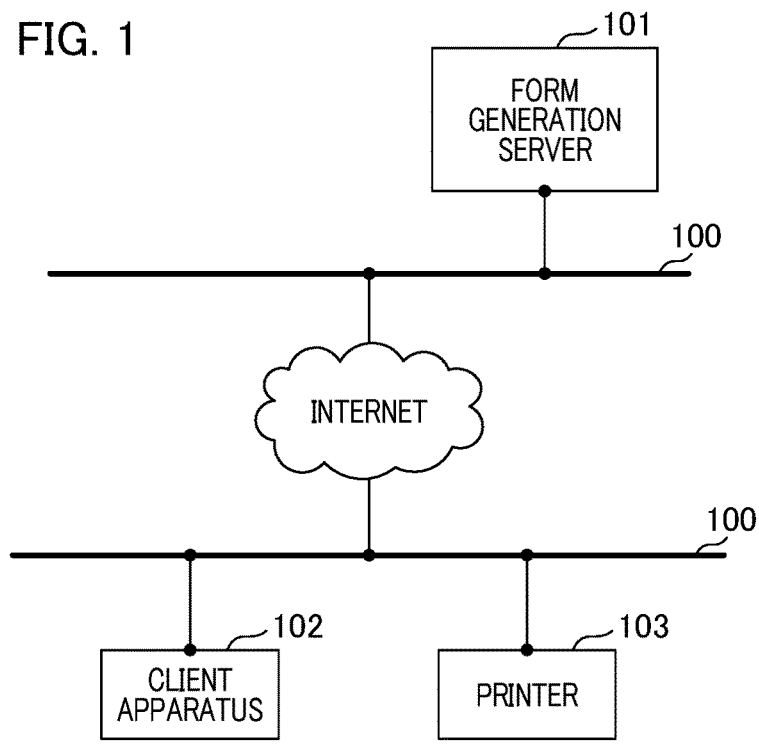
FIG. 1 is a diagram illustrating a configuration example of a system of the present embodiment.

FIG. 1 is a diagram illustrating a configuration example of a system of the present embodiment. An information processing system illustrated in FIG. 1 includes a document generation server 101 and a client apparatus 102. The document generation server 101 is a server apparatus of the present embodiment. The document generation server 101 executes an overlay output process. That is, the document generation server 101 generates a form document page by superimposing a field data file which is text data with a form information file including predetermined form information. The document generation server 101 instructs a virtual printer to generate print data corresponding to the form document page as an electronic file according to a request from the client apparatus 102.

Also, the document generation server 101 executes a process of generating the document browsing screen data. The document browsing screen data is data for displaying a browsing screen (form browsing screen) for browsing and editing the form document page. In the present embodiment, the document browsing screen data includes at least field attribute information of the form document, an editable form document page, and a document browsing program. The field attribute information is attribute information about a field of the form document. The document browsing program is a control program for controlling the browsing and editing of the form document page. In the present embodiment, the document browsing program is a web application which operates on a WWW browser capable of being distributed via a network. The document browsing program, for example, is an application program (Java program) which operates according to a mash-up language (hypertext markup language (HTML)) representing a web page and JavaScript which is a programming language operable on a WWW browser. The document browsing program may be an application to be executed on the computer system rather than an application operable on the WWW browser. Also, the document generation server 101 may be configured to generate only an electronic document file of the form document page and a file representing the field attribute information, and the client apparatus 102 may be configured to include an application capable of executing a operation of browsing and editing the document using an electronic document file.

The printer 103 receives a request from the client apparatus 102 to perform a process of printing document data on paper. In addition, the document generation server 101, the client apparatus 102, and the printer are connected to be communicable through a network 100. The network 100, for example, may be any one of the Internet, a local area network (LAN), a wide area network (WAN), a telephone line, a dedicated digital line, an asynchronous transfer mode (ATM) or frame relay line, a cable television line, and a data broadcasting wireless line. In addition, the network 100 may be implemented by a combination thereof. Also, a communication means from the client apparatus 102 to the document generation server 101 may be different from a communication means from the client apparatus 102 to the printer 103.

Figure 2:
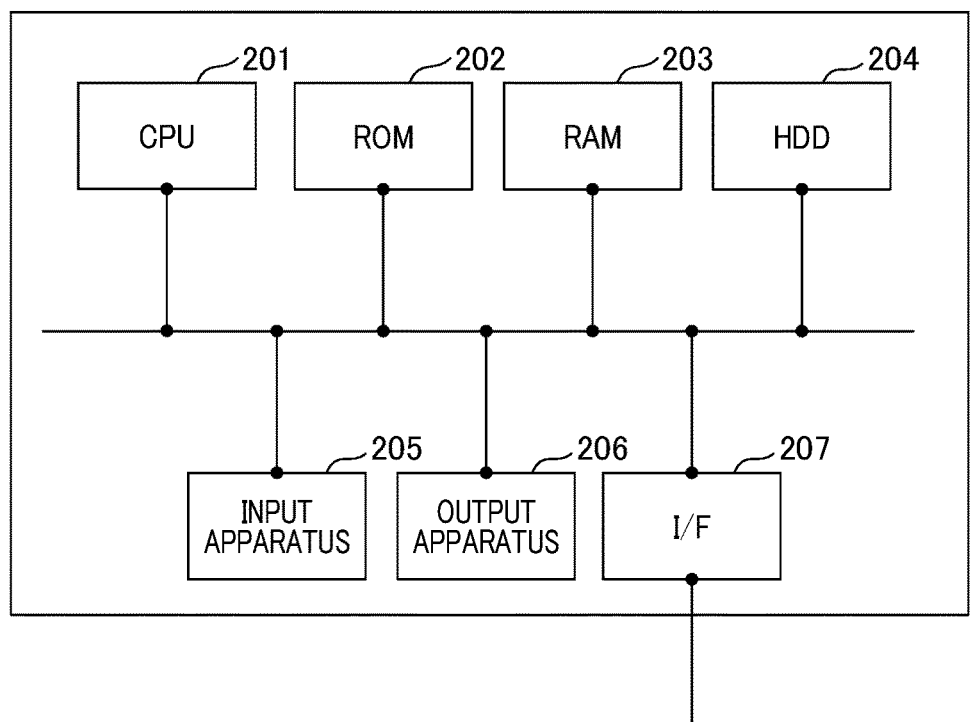
FIG. 2 is a diagram illustrating a hardware configuration of an apparatus for implementing a document generation server and a client apparatus.

FIG. 2 is a diagram illustrating a hardware configuration of an apparatus for implementing the document generation server and the client apparatus. The apparatus illustrated in FIG. 2 includes components from a central processing unit (CPU) 201 to an I/F 207. The CPU 201 directly or indirectly controls each device (a read only memory (ROM), a random access memory (RAM), etc.) connected by an internal bus and executes a program for implementing the present invention. A basic input output system (BIOS) is stored in the ROM.

A RAM 203 is used as a work area of the CPU 201 or used as a temporary storage apparatus for loading a software module for implementing the present invention. A hard disk drive (HDD) 204 stores an operating system (OS) which is basic software or a software module. A solid state drive (SSD) may be provided instead of the HDD 204.

An input apparatus 205 inputs information according to the user's operation input. The input apparatus 205 is a keyboard (not illustrated), a pointing device (not illustrated), or the like. An output apparatus 206 outputs information. The output apparatus 206 is connected to a display. The I/F is an interface for connecting to the network 100. After the apparatus is activated, the BIOS is executed by the CPU 201 and the OS is loaded from the HDD 204 to the RAM 203 so that the OS is executable. The CPU 201 loads various software modules from the HDD 204 to the RAM 203 according to an operation of the OS at any time so that the software modules are executable. Various types of software modules are executed and operated by the CPU 201. In addition, the I/F 207 is controlled by the CPU 201 according to the operation of the OS and implements communication with an external apparatus.

Figure 3:
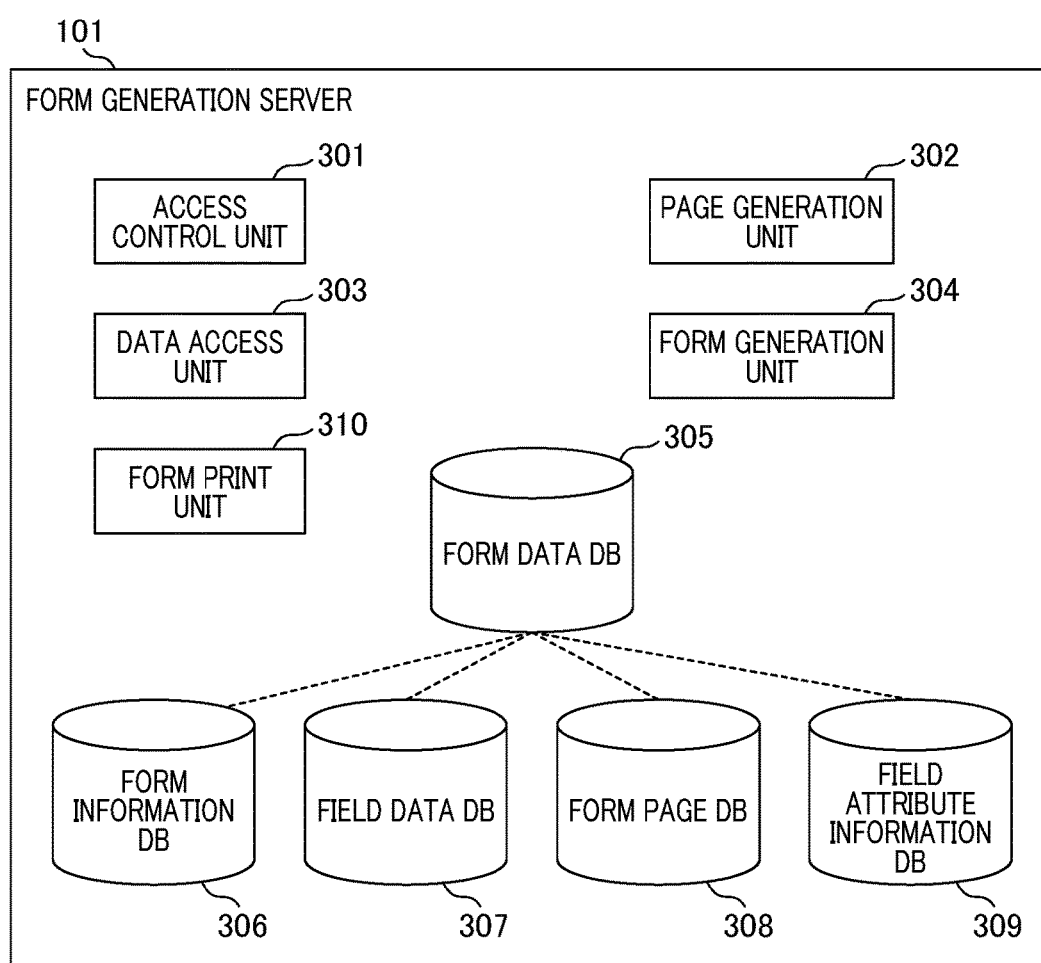
FIG. 3 is a configuration example of a software module which operates on the document generation server.

FIG. 3 is a configuration example of a software module which operates on the document generation server. Each software module is stored in the HDD 204 illustrated in FIG. 2 and loaded to the RAM 203 by the CPU 201 for execution. The document generation server 101 includes components from an access control unit 301 to a field attribute DB 309. The access control unit 301 performs user authentication according to a request from the client apparatus 102.

The page generation unit 302 generates a web page for returning a response to the client apparatus 102. The page generation unit 302 generates a file of HTML, JavaScript, or the like necessary for a web application which is a document browsing program and returns the generated file to the client apparatus 102. The data access unit 303 performs a process of accessing the DBs 305 to 309.

The document generation unit 304 reads a form information file from the form information DB 306 via the data access unit 303. Also, the document generation unit 304 reads a field data file from the field data DB 307 via the data access unit 303. The document generation unit 304 generates the form document page by applying field data indicated by the field data file to form information indicated by the read form information file. The document generation unit 304 generates an electronic file of a form document page using software of a virtual printer or the like. The document print unit 310 receives a print file generation request from the client apparatus 102 and converts the electronic file of the form document page into a printable format.

The document data DB 305 stores the document data. The document data indicates information about a document name and a possessor, and has information representing a form information file and a field data file from which the form document is generated. In addition, the document data has information indicating a form document page which is an overlay result of the form document.

The form information DB 306 stores the form information file. The field data DB 307 stores the field data file. The document page DB 308 stores a form document page file generated by the document generation unit 304. The file attribute DB 309 stores a field attribute information file generated at the time of a document overlay process.

Figure 4:
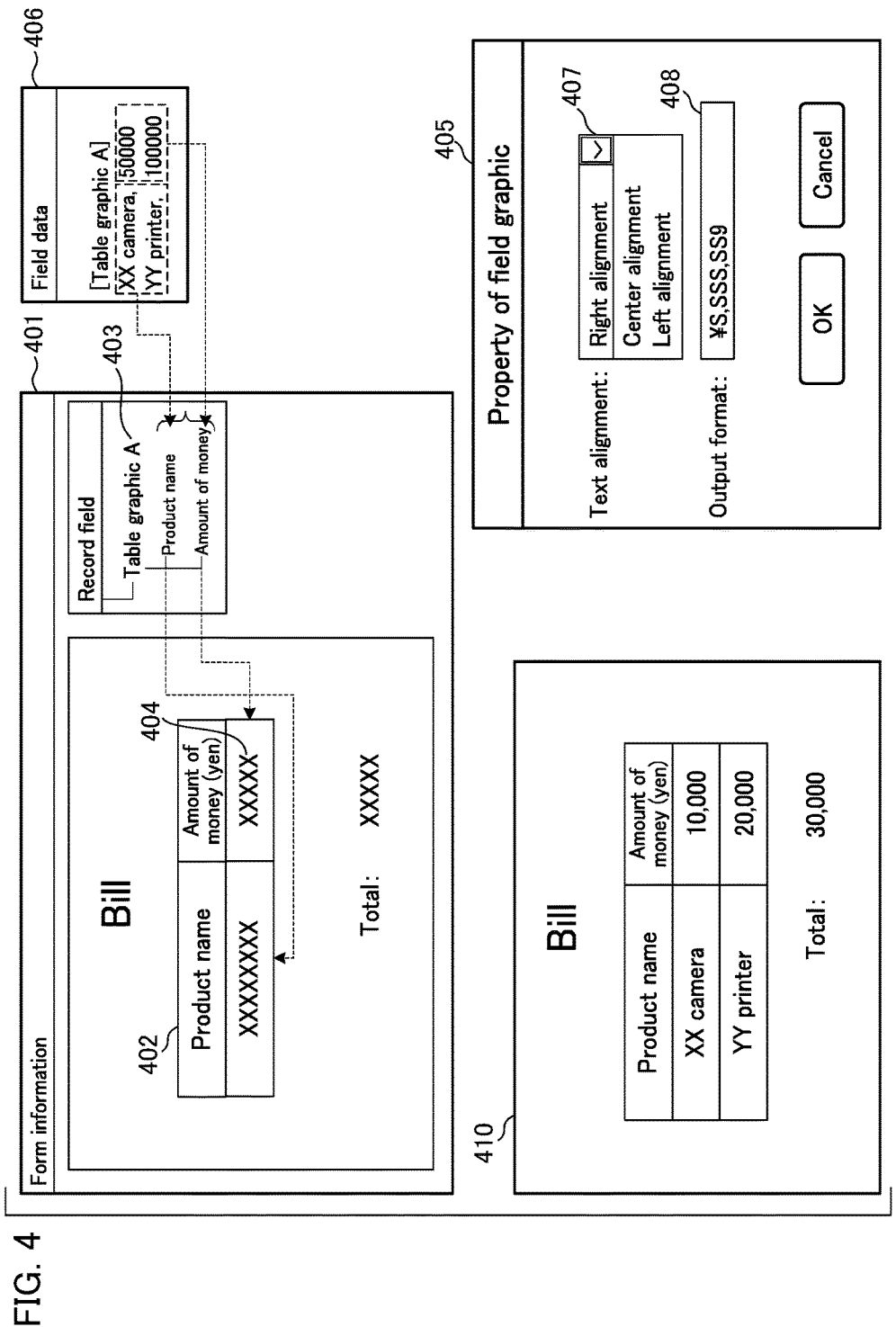
FIG. 4 is a diagram illustrating a document overlay process by the document generation server.

FIG. 4 is a diagram illustrating a form overlay process executed by the document generation server. The form information is created using a dedicated form information design system. The form information is constituted of a fixed form graphic independent of the field data and a field graphic displayed according to an output format in which the received field data is designated. It is necessary to create an item (field) for receiving the field data in advance to create the field graphic. The field is created from a dedicated screen displayed by the form information design system. If the field graphic is created, the association with a field that is a source from which it was created is internally performed. Because it is necessary to receive table data in units of records in the case of a tabular field graphic (table graphic) 402, a record field 403 is created.

In the field graphics, there are settings of layouts of text position alignment such as left alignment/center alignment/right alignment, text orientation such as horizontal/vertical writing. Also, there is a setting of an output format for designating a format in which a value of received data is output. A property screen 405 of the field graphic is a screen in which the property of the field graphic 404 is displayed. The property screen 405 of the field graphic is displayed by an operation of clicking the field graphic 404 or the like. A setting field 407 is used to set the text alignment. A setting field 408 is used to set the output format.

The document generation server 101 reads a form information file 401 in which a field graphic is defined and a corresponding field data file 406. The document generation server 101 executes the overlay output process by superimposing the read form information file 401 with the field data file 406. Reference numeral 410 of FIG. 4 denotes an example of a result of an overlay output process.

Figure 5:
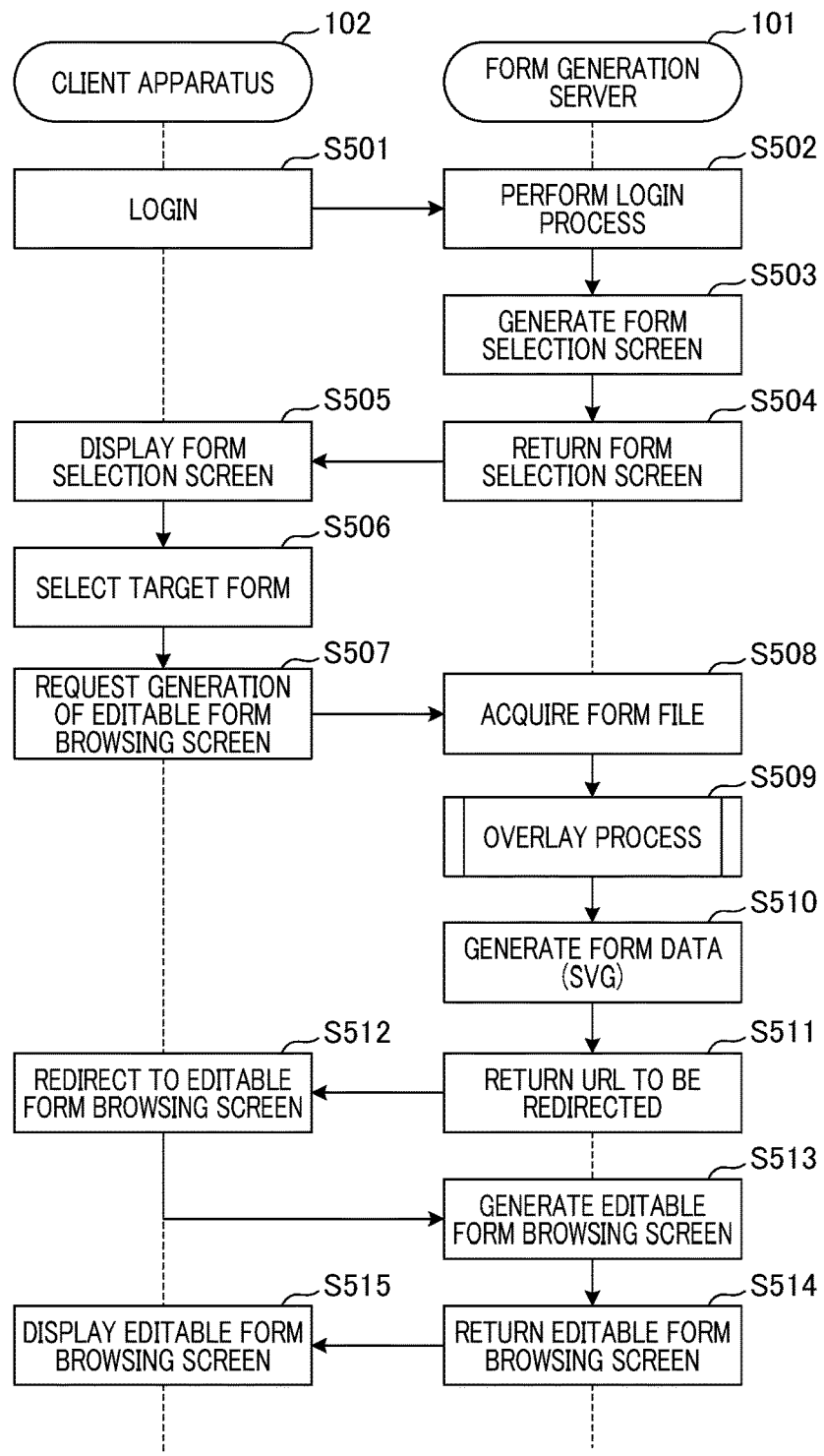
FIG. 5 is a diagram illustrating a process of generating document browsing screen data.

FIG. 5 is a diagram illustrating a process of generating document browsing screen data. In S501, the CPU 201 of the client apparatus 102 transmits a login request to the document generation server 101 according to the user's operation on a login screen displayed by a WWW browser of the client apparatus 102.

Figure 6:
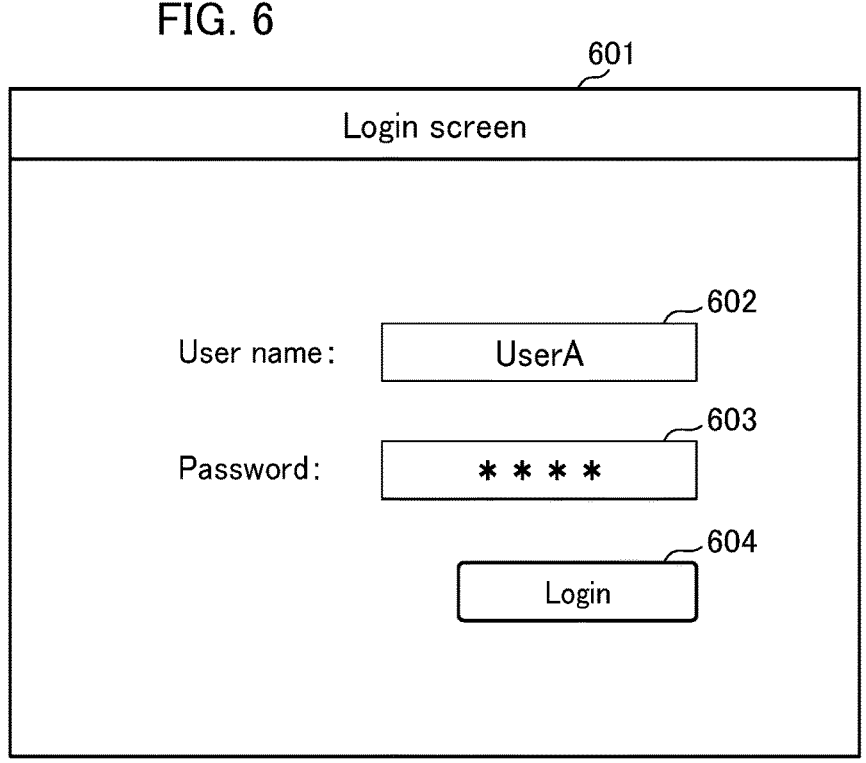
FIG. 6 is a diagram illustrating an example of a login screen.

FIG. 6 is a diagram illustrating an example of a login screen. The user inputs a user name and a password to a user name input text box 602 and a password input text box 603 of the login screen 601 and presses a login button 604. Thereby, the client apparatus 102 transmits the login request to the document generation server 101.

The process returns to FIG. 5. In S502, the access control unit 301 of the document generation server 101 performs a login process based on content of the login request received from the client apparatus 102. The access control unit 301 performs basic authentication and the process proceeds to S503 if it is confirmed that the user name and the password are valid. Also, because the basic authentication is a general authentication process, description thereof will be omitted. In S503, the page generation unit 302 of the document generation server 101 generates a document selection screen according to information about the logged-in user.

Figure 7:
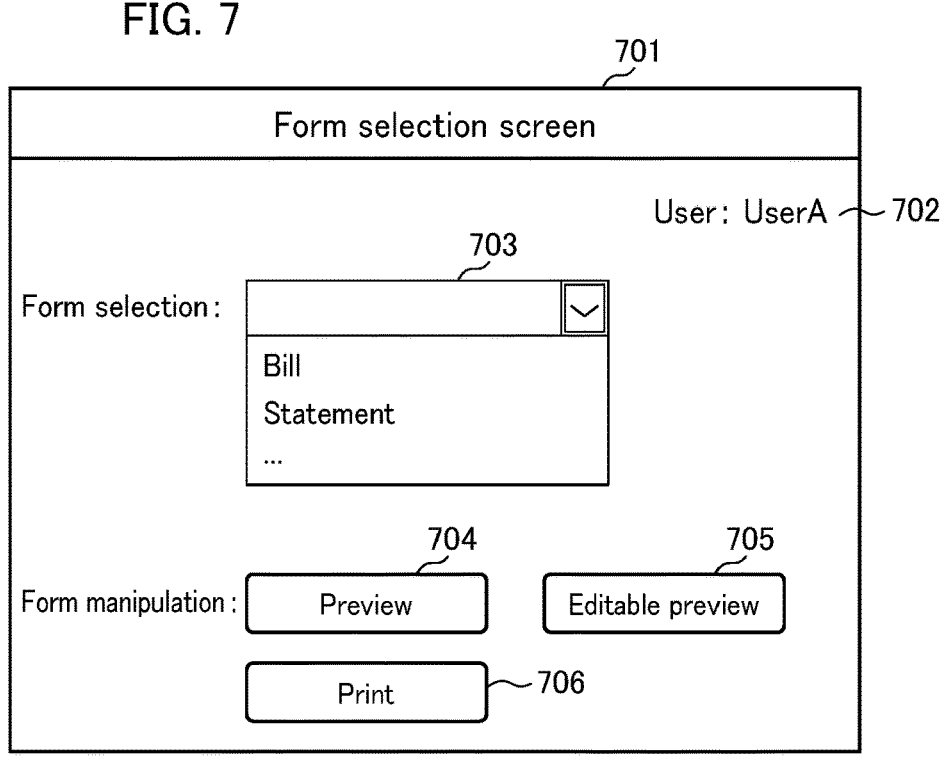
FIG. 7 is a diagram illustrating an example of a document selection screen.

FIG. 7 is a diagram illustrating an example of the document selection screen. In the document selection screen 701, a user name of the user who is currently logged in is displayed in a region 702. A form document list possessed by the user who is currently logged in is displayed in a dropdown list 703. The information displayed in the dropdown list 703 is document names of forms possessed by the logged-in user extracted from the document data DB 305 via the data access unit 303 by the page generation unit 302.

A document operation button 704 is a button for executing a preview of a form document corresponding to a document name selected in the dropdown list 703. A document operation button 705 is a button for executing an editable preview of the form document corresponding to the document name selected in the dropdown list 703. A document operation button 706 is a button for executing a print operation of the form document corresponding to the document name selected in the dropdown list 703. Although a process after the editable preview button 705 is pressed will be described below, description of a process after the preview button 704 and the print button 706 are pressed will be omitted.

The process returns to FIG. 5. In S504, the access control unit 301 of the document generation server 101 returns the document selection screen 701 generated in S503 to the client apparatus 102 via the network 100. In S505, the client apparatus 102 receives the document selection screen 701 from the document generation server 101 and a WWW browser is displayed on the screen.

In S506, the user selects a document name of a form document desired to be manipulated from the dropdown list 703 within the document selection screen 701. Subsequently, if the user presses the editable preview button 705 within the document selection screen 701 in S507, the CPU 201 of the client apparatus 102 transmits a request for generating the editable document browsing screen to the document generation server 101. The request for generating the editable document browsing screen has information for specifying a browsing target document.

In S508, the document generation unit 304 of the document generation server 101 acquires a form information file associated with a browsing target form document from the form information DB 306 via the data access unit 303. Also, the document generation unit 304 acquires a field data file associated with the browsing target form document from the field data DB 307 via the data access unit 303. In S509, the document generation unit 304 of the document generation server 101 performs an overlay output process using the form information file and the field data file acquired in S508.

Figure 8:
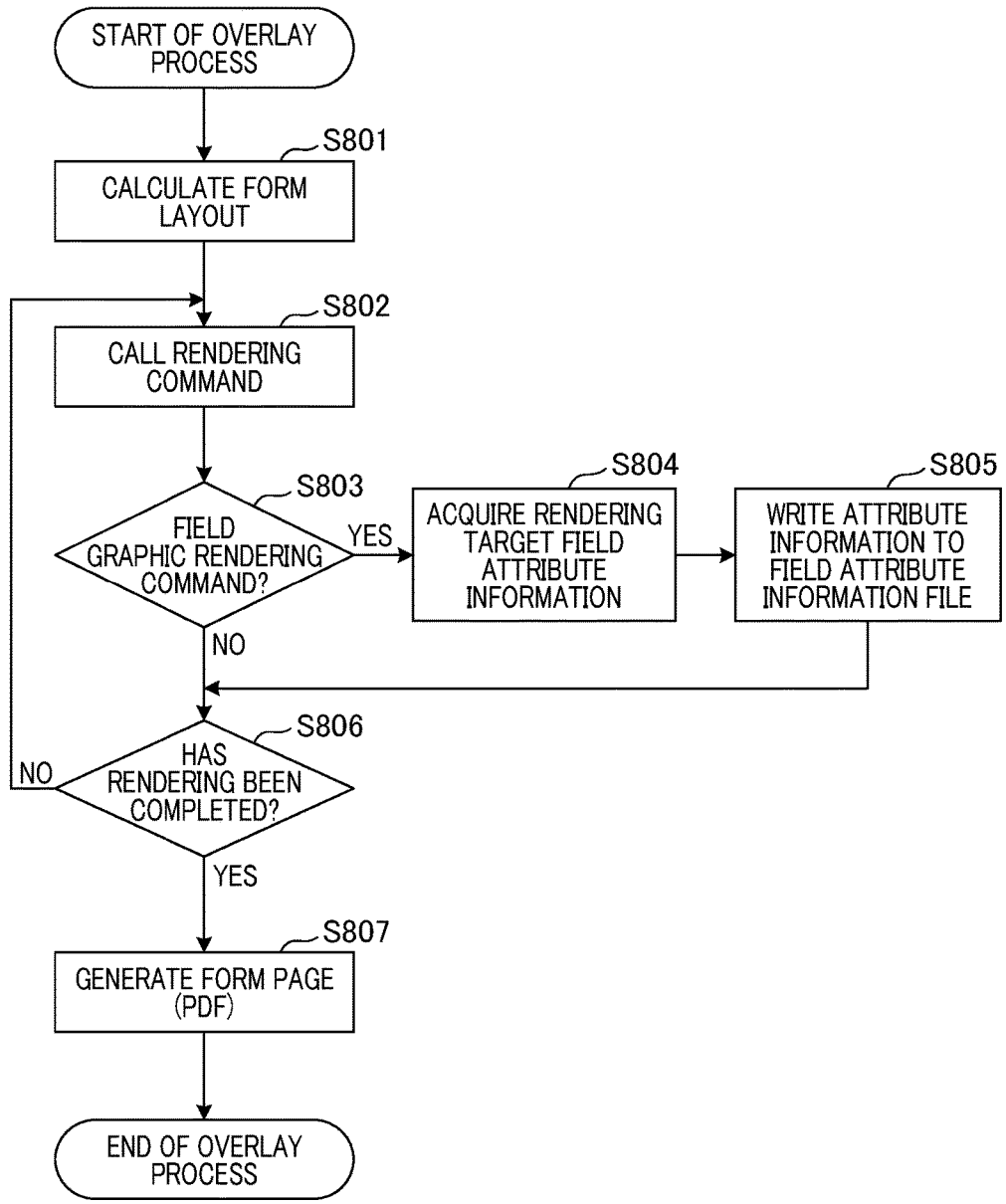
FIG. 8 is a flowchart illustrating an overlay output process.

FIG. 8 is a flowchart illustrating an overlay output process in S509 of FIG. 5. In S801, the document generation unit 304 calculates a layout configuration of the output form document using the form information file and the field data file. Subsequently, in S802, the document generation unit 304 sequentially executes a rendering command of each graphic (a form graphic independent of field data and a field graphic depending upon the field data) according to the layout configuration calculated in S801.

In S803, the document generation unit 304 determines whether the rendering command executed in S802 is a rendering command of a field graphic. If the executed rendering command is not the rendering command of the field graphic, the process proceeds to S806. If the executed rendering command is the rendering command of the field graphic, the process proceeds to S804.

In S804, the document generation unit 304 acquires attribute information of a target field of the rendering command executed in S802. The acquired attribute information is a field name of a target field graphic, a type of field graphic (a record field type, a total field type, or the like), data of a record to be rendered, a rendering position of the data, an output format of the field graphic, and layout information of the field graphic.

In S805, the document generation unit 304 writes the attribute information acquired in S804 to the field attribute information file. If there is no field attribute information file, new creation is performed. Subsequently, the document generation unit 304 stores the generated field attribute information file in the field attribute information file DB 309 via the data access unit 303. The document generation unit 304 adds information for specifying the generated field attribute information file to the document record within the document data DB 305.

Figure 9:
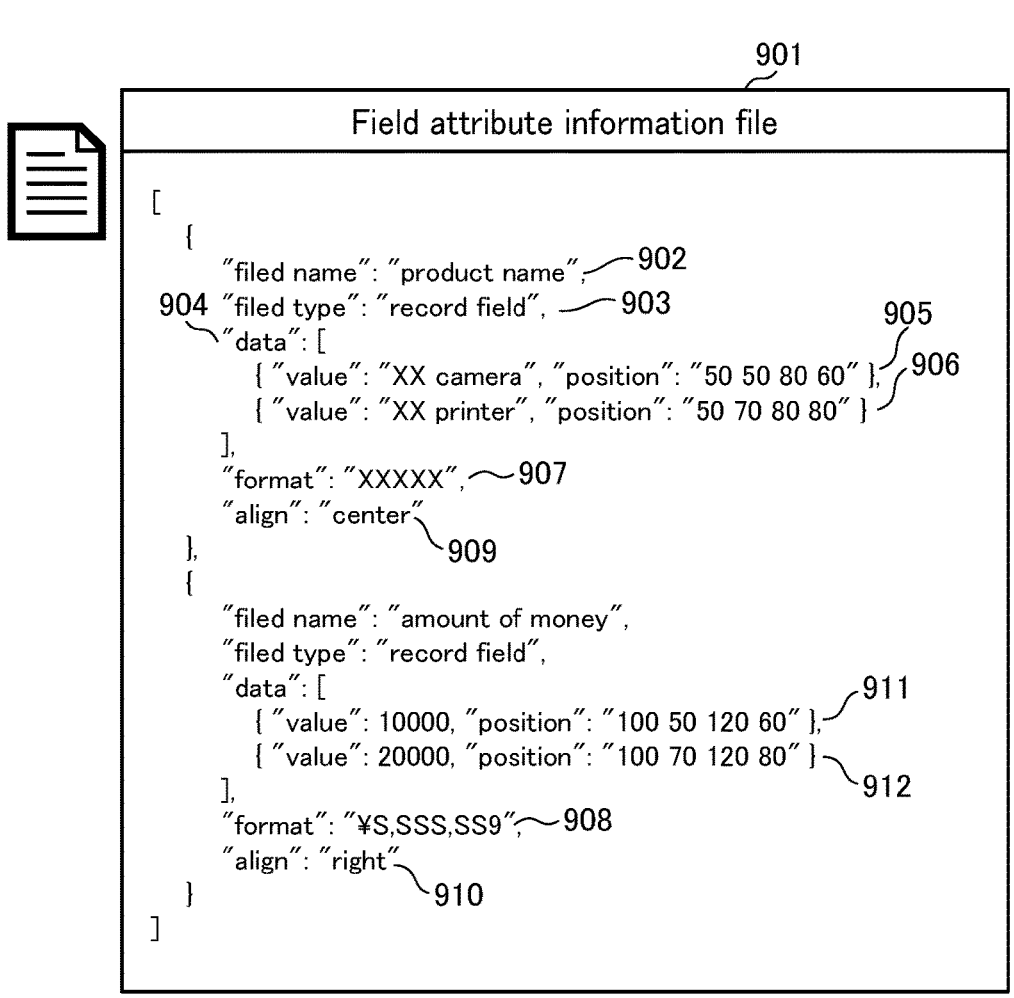
FIG. 9 is an example of a field attribute information file.

FIG. 9 is an example of the field attribute information file. In the present embodiment, the field attribute information file has a JavaScript Object Notation (JSON) format. A record 902 indicates a field name of a field graphic. A record 903 indicates a type of the field graphic. A record 904 indicates rendering information of data of the field graphic. Records 905, 906, 911, and 912 indicate a data value and rendering position coordinates of the field graphic. Records 907 and 908 indicate an output format of the field graphic 902. In this example, the record 907 is described as "XXXXX." This description indicates that data is directly output as a character string.

The record 908 is described as "¥S,SSS,SS9." This description indicates that numerical data is output with separators added. For example, if the numerical data is "10000," this numerical data is output as "¥10,000." Records 909 and 910 indicate text position alignment of the field graphic 902. The record 909 indicates that the field graphic 902 is arranged in a center-aligned state. The record 910 indicates that the field graphic 902 is arranged in a right-aligned state. In addition to the above-described example, the field attribute information file may have a setting of a layout such as text orientation such as horizontal/vertical writing.

The process returns to FIG. 8. In S806, the document generation unit 304 determines whether all rendering commands are completed. If there is an uncompleted rendering command, the process returns to S802 and the next rendering command is executed. If all the rendering commands are completed, the process proceeds to S807. In S807, the document generation unit 304 generates a form document page of a PDF format via the virtual printer using page description language (PDL) information which is a result of a rendering process. The PDL information is information for indicating rendering for a printer and described in a page description language.

The process returns to FIG. 5. In S510, the document generation unit 304 converts the form document page of the PDF format generated in S807 into a form document page of an SVG format. Because the form document page of the PDF format cannot be directly edited on the WWW browser, the form document page is converted into an editable format (SVG format in the present embodiment).

Next, the document generation unit 304 stores the converted form document page of the SVG format in the document page file DB 308 via the data access unit 303. The document generation unit 304 adds information for specifying the generated form document page of the SVG format to the document record within the document data DB 305.

Next, in S511, the document generation server 101 returns the URL of the editable document browsing screen requested in S507 to the client apparatus 102. The information for specifying the form document page of the SVG format generated in S510 is included in the returned URL. In the case of the present embodiment, the document name of the form document data associated with the form document page is included within the returned URL.

In S512, the client apparatus 102 transmits a request (redirect request) to be redirected to the editable form browsing screen to the form generation server 101 using the URL returned in S511. Subsequently, in S513, the page generation unit 302 of the document generation server 101 functions as a browsing screen generation means and generates data of the editable document browsing screen (document browsing screen data) according to content of the redirect request transmitted in S512. The document browsing screen data includes the form document page file of the form document serving as a request target, a control program (Java script program) for controlling browsing, editing, and printing operations on the form document page file, and a field attribute information file necessary at the time of the editing operation. The page generation unit 302 acquires the form document page file and the field attribute information file associated with the form document of the request target from the document page DB 308 and the field attribute DB 309 based on the document name within the redirect request and includes the acquired files in the document browsing screen data.

In S514, the document generation server 101 returns the document browsing screen data generated in S513 to the client apparatus 102. In S515, the client apparatus 102 receives a response from the document generation server 101 and displays the editable document browsing screen based on the document browsing screen data included in the response.

Figure 10A:
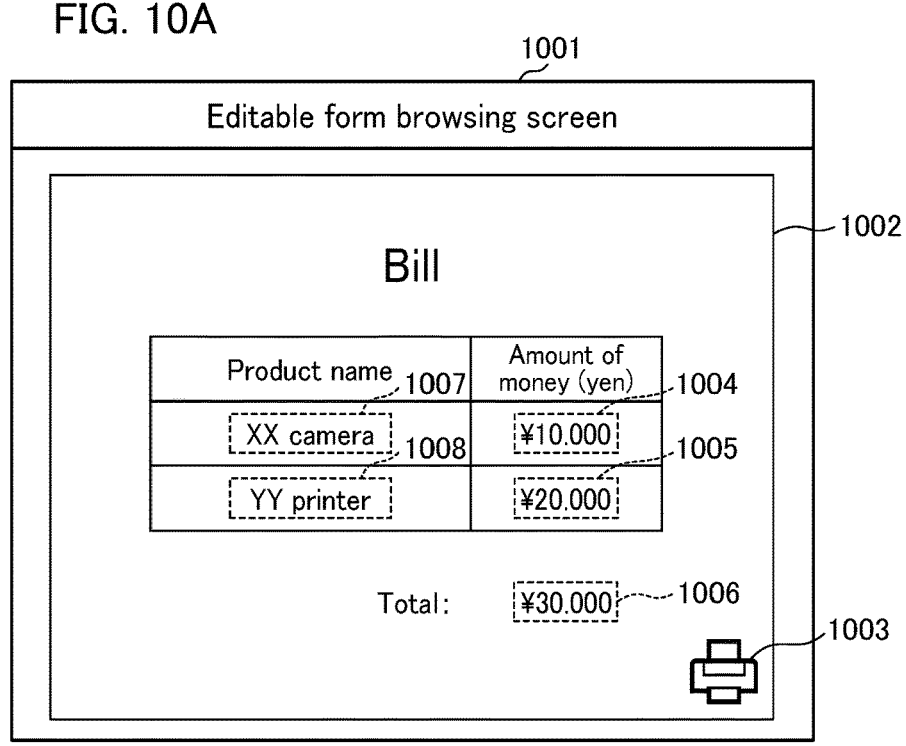
FIGS. 10A and 10B are diagrams illustrating an editable document browsing screen.
Figure 10B:
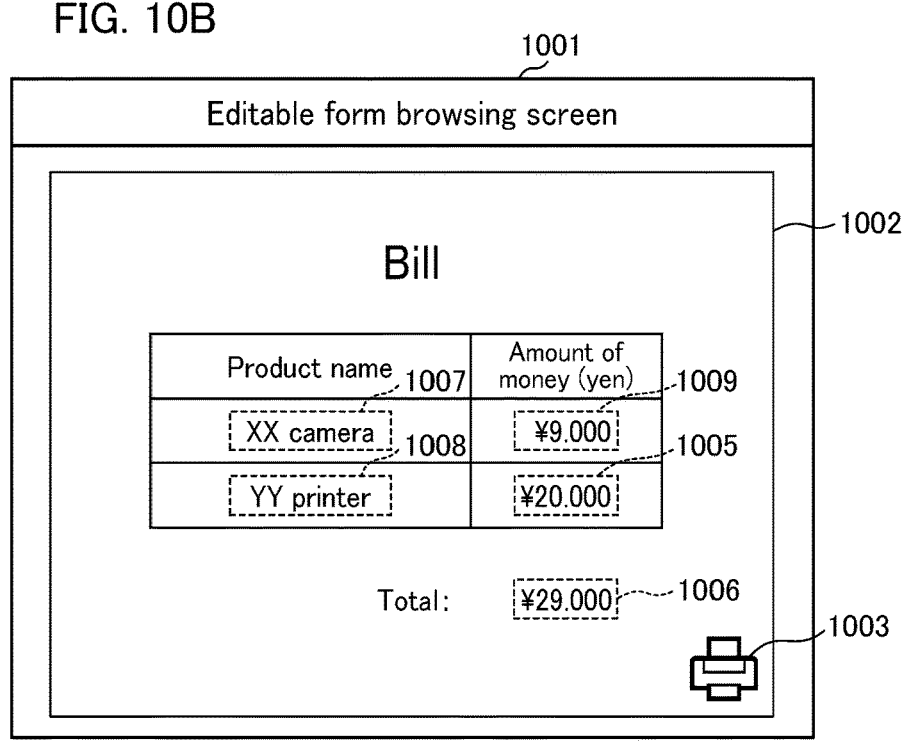

FIGS. 10A and 10B are diagrams illustrating an editable document browsing screen in the present embodiment. Reference numeral 1002 within the document browsing screen 1001 illustrated in FIGS. 10A and 10B denotes a region in which the form document page of the SVG format is displayed. Switching to a previous/subsequent form document page can be performed with a horizontal flick operation in the region 1002. A button 1003 is a button for printing a currently displayed form document page. Rendering results of "amount of money" records of the record field are displayed in regions 1004 and 1005. A rendering result of a sum of "amount of money" records of regions 1004 and 100 is displayed in region 1006. Rendering results of "product name" records are displayed in regions 1007 and 1008. Values and coordinate information of the regions 1004 and 1005 are described on lines 911 and 912 of the field attribute information file 901 (FIG. 9). If the user performs a click operation in the region 1002, an editing program within the editable document browsing screen operates and an editing process to be described with reference to FIG. 11 is performed.

Figure 11:
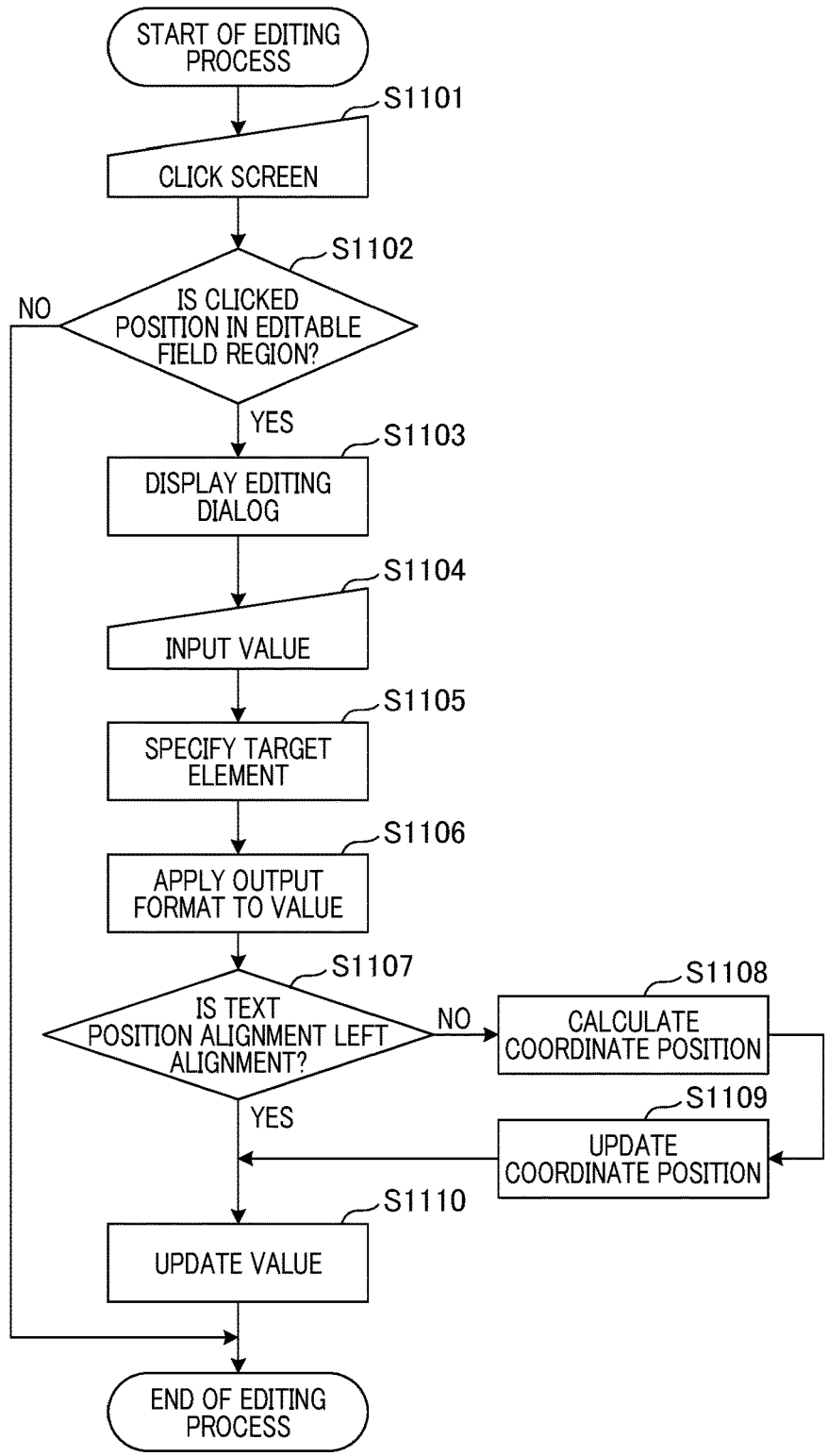
FIG. 11 is a diagram illustrating an editing process according to an editing operation on the document browsing screen.

FIG. 11 is a diagram illustrating an editing process according to an editing operation on the document browsing screen. This editing process is implemented by the CPU 201 of the client apparatus 102 executing the document browsing program included in the document screen data. In S1101, the user performs the click operation within the region 1002 of the editable document browsing screen 1001. Subsequently, in S1102, it is determined whether the document browsing program included in the document browsing screen data is on a field in which the position clicked in S1101 is editable. If coordinates of the clicked position are included in regions ("position" attributes within lines 905, 906, 911, and 912) of data of the field attribute information file 901, it is determined that the clicked position is on the editable field. If the clicked position is not on the editable field, the process ends. If the clicked position is on the editable field, the process proceeds to S1103.

Figure 12:
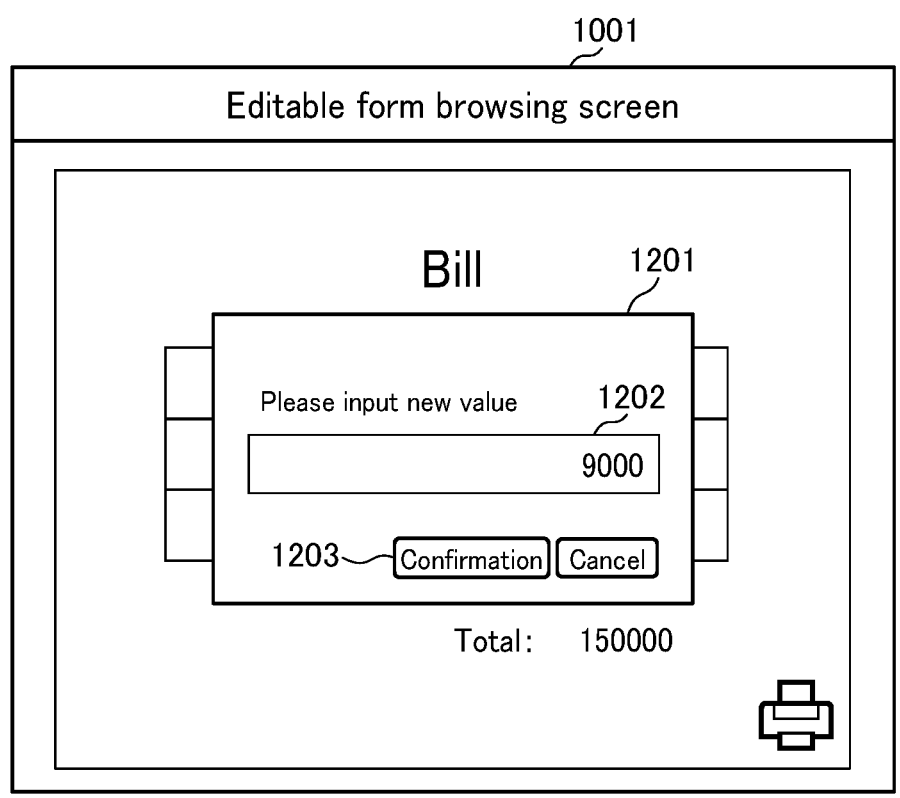
FIG. 12 is a display example of an editing dialog.

In S1103, the document browsing program displays an editing dialog 1201. In the case of the present embodiment, the editing dialog 1201 is displayed if one of regions 1004, 1005, 1007 and 1008 of the editable document browsing screen 1001 is clicked. In addition, the document browsing program stores information corresponding to a click position within the field attribute information file 901 included in the document browsing screen data. FIG. 12 is a display example of the editing dialog when a user clicks the region 1004 and edits the value of region 1004. In S1104, the user inputs a new value to the inside of a text box 1202 of the editing dialog 1201 and clicks a confirmation button 1203. In this example, a value of "9000" is assumed to be input. The document browsing program specifies a text element (<text> tag) corresponding to the click position in S1101 from an SVG file corresponding to a form document page displayed within the region 1002.

Figure 13A:
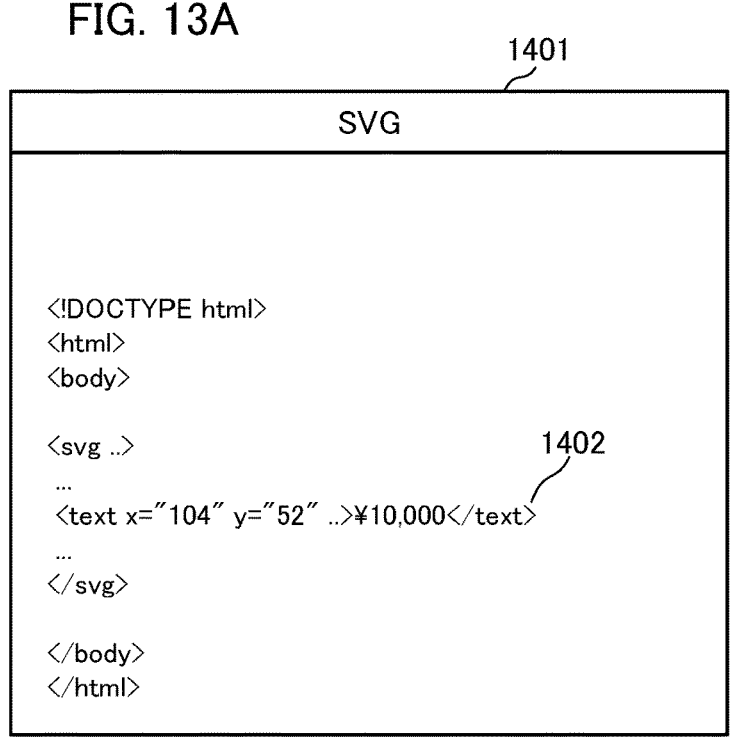
FIGS. 13A and 13B are diagrams illustrating an example of an SVG file.
Figure 13B:
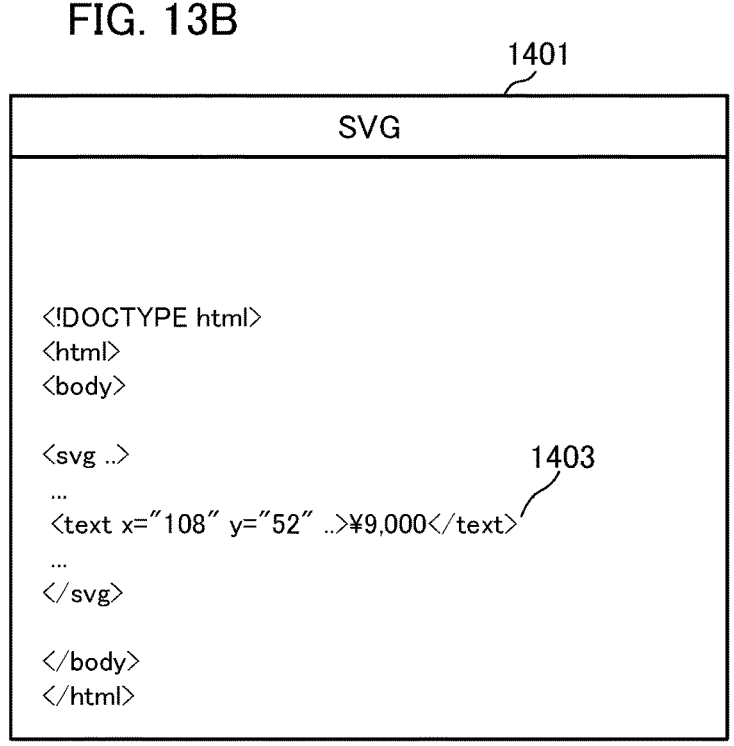

FIGS. 13A and 13B are diagrams illustrating an example of an SVG file. In this example, a text element 1402 is a text element corresponding to a click position of S1101. That is, the text element 1402 represents a field graphic 1004 in FIG. 10A.

In S1106, the document browsing program acquires field attribute information corresponding to a specified text element from the field attribute information file 901 (FIG. 9). Specifically, the document browsing program acquires records 911, 908, and 910 from the field attribute information file 901 of FIG. 9.

Subsequently, the document browsing program generates a value by applying the above-described acquired field attribute information to the value input by the user in S1104. That is, the document browsing program functions as an application means for applying the attribute information corresponding to the field to edited data according to a data editing operation performed on a field of the form document using the browsing screen. In this example, the record 908 indicates that the numerical data is output with separators added. Accordingly, the document browsing program generates a value of "¥9,000." In addition, the document browsing program replaces the value within the field attribute information file 901 with the above-described generated value.

Also, type information (character type/number side/date-time type, etc.) of a value within the field attribute information file 901 may also be saved and it may be confirmed whether the user-input value matches the type information. If the user-input value does not match the type information, the editing dialog 1201 is re-displayed along with a warning message.

In addition, in S1107 of FIG. 11, the document browsing program determines whether text position alignment of the field is left alignment. In this example, the record 908 of FIG. 9 indicates that the text position alignment is right alignment. Therefore, the process proceeds to S1108. Also, if the text position alignment of the field is the left alignment, the process proceeds to S1110.

In S1108, the document browsing program calculates a coordinate position of a text element (<text> tag) in which the value generated in S1106 is arranged. The document browsing program calculates a coordinate position from the text position alignment of the field and a difference between a character string length of the value before editing and a character string length of the value generated in S1106. For example, it is assumed that the character string length of the value "¥10,000" before the editing is 20 and the character string length of "¥9,000" generated in S1106 is 16. The document browsing program calculates 4, which is a result of subtracting the character string length of 16 of the new value from the character string length of 20 of the value before editing, to be added to an X coordinate for the right alignment.

In S1109, the document browsing program adds 4 to the X coordinate of the text element (<text> tag). In S1110, the document browsing program updates the value. This result is that the editable document browsing screen 1001 is updated as illustrated in FIG. 10B if the user clicks within the region 1004 and inputs "9000" in the displayed editing dialog 1201. The character string "¥9,000" of the region 1009 is right-aligned. Also, as illustrated in FIG. 13B, in an updated SVG file 1401, an X coordinate of the text element 1403 corresponding to the field graphic 1009 of FIG. 10B is obtained by adding 4 to an X coordinate of the text element 1402 of FIG. 13A.

According to the present embodiment, it is possible to hold layout information or format information of data and easily perform an editing operation if a form document file generated in the overlay process is converted into a predetermined format in which editing is easy and the converted file is browsed and edited in the WWW browser.

Second Embodiment

Next, second embodiment will be described. Description of parts common to those of first embodiment will be omitted and only different parts will be described below. An information processing system of the present embodiment prints document data browsed and edited in a similar process to first embodiment.

Figure 14:
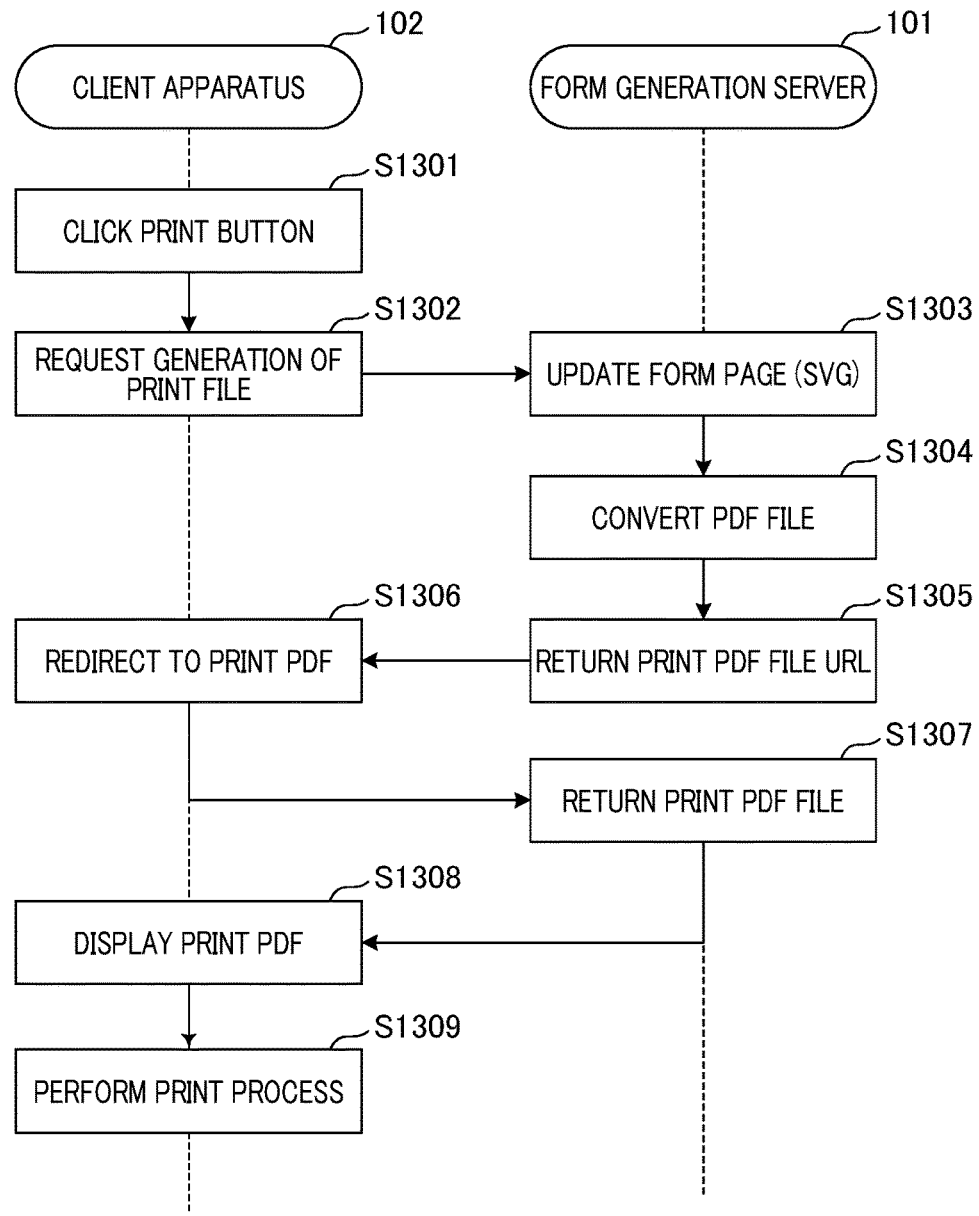
FIG. 14 is a diagram illustrating a print process.

FIG. 14 is a diagram illustrating a print process if a print button of an editable document browsing screen is pressed. In S1301, a user presses a button 1003 of an editable document browsing screen 1001. In S1302, a client apparatus 102 transmits a request for generating a print file to a document generation server 101. The request for generating the print file is a request for requesting the generation of the print file. The request for generating the print file includes a form document page file of an SVG format currently held by the client apparatus 102.

In S1303, a document print unit 310 of the document generation server 101 updates a form document page file within a document page DB 308 in a form document page file included in the request for generating the print file.

In S1304, the document generation unit 304 functions as a print data generation means, which converts the document page file of the SVG format included in the request for generating the print file of a PDF format (a print PDF file). Subsequently, in S1305, the document print unit 310 returns a URL for accessing the print PDF file generated in S1304 to the client apparatus.

In S1306, the client apparatus 102 performs redirection to the URL for accessing the print PDF file returned in S1305. Subsequently, in S1307, the access control unit 301 of the document generation server 101 returns the print PDF file generated in S1304 to the client apparatus.

Next, in S1308, the client apparatus 102 receives the print PDF file returned in S1307 and displays the print PDF file using software (Adobe PDF Reader or the like) capable of displaying the print PDF file using a web browser. In S1309, the client apparatus 102 prints the PDF using predetermined software.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-040335, filed Mar. 2, 2015 which is hereby incorporated by reference wherein in its entirety.

What is claimed is:

1. An information processing system comprising:
a document generation unit configured to generate an electronic form document page and a field attribute information file by performing an overlay process that uses form information and field data, wherein the form information includes attribute information indicating at least one of information about text position alignment of each field and information about an output format of each field, and wherein a file format of the generated electronic form document page is a PDF format, and wherein the generated field attribute information file includes the attribute information indicating at least one of the information about text position alignment of each field and the information about the output format of each field;
a conversion unit configured to convert the electronic form document page generated by the document generation unit into an electronic editable form document page, wherein a file format of the converted electronic editable form document page is an SVG format; and
a browsing screen generation unit configured to generate data for displaying a browsing screen for browsing and editing the converted electronic editable form document page of the SVG format, wherein the generated data include the generated field attribute information file, the converted electronic editable form document page of the SVG format, and a control program for controlling editing of the included electronic editable form document page of the SVG format based on the included field attribute information file, and wherein the included field attribute information file is used when editing a field in the included electronic editable form document page of the SVG format.

2. The information processing system according to claim 1, further comprising:
a transmission unit configured to transmit the generated data for displaying the browsing screen to a client apparatus,
wherein the client apparatus comprises:
a reception unit configured to receive the transmitted data;
a display unit configured to display the browsing screen based on the data received by the reception unit; and
an application unit configured to apply, in response to editing data of a field in the electronic editable form document page of the SVG format using the browsing screen, the attribute information corresponding to the edited field to the edited data based on the control program and the field attribute information file.

3. The information processing system according to claim 2, wherein the application unit calculates a coordinate position in the electronic editable form document page of the edited data based on a value of the edited data and the information included in the field attribute information file.

4. The information processing system according to claim 3, wherein the application unit updates the coordinate position of the edited data in the electronic editable form document page based on the control program, the information about the text position alignment included in the field attribute information file and a difference between a character string length of a value of data before the editing and a character string length of the value of the edited data.

5. The information processing system according to claim 4, wherein the application unit updates the coordinate position of the edited data in the electronic editable form document page if the text position alignment indicated in the information about the text position alignment included in the field attribute information file is not left alignment.

6. The information processing system according to claim 1, further comprising:
a print data generation unit configured to generate print data based on the electronic editable form document page of the SVG format that has been edited on the browsing screen.

7. The information processing system according to claim 1, further comprising:
a first storage unit in which the form information is stored in advance;
a second storage unit in which the field data is stored in advance;
a third storage unit in which the converted electronic editable form document page of the SVG format is stored; and
a fourth storage unit in which the generated field attribute information file is stored.

8. A server apparatus comprising:
a processor; and
a memory for storing a program to be executed by the processor to perform a process which comprises:
generating an electronic form document page and a field attribute information file by performing an overlay process that uses form information and field data, wherein the form information includes attribute information indicating at least one of information about text position alignment of each field and information about an output format of each field, and wherein a file format of the generated electronic form document page is a PDF format, and wherein the generated field attribute information file includes the attribute information indicating at least one of the information about text position alignment of each field and the information about the output format of each field;

converting the generated electronic form document page into an electronic editable form document page, wherein a file format of the converted electronic editable form document page is an SVG format;

generating data for displaying a browsing screen for browsing and editing the converted electronic editable form document page of the SVG format, wherein the generated data include the generated field attribute information file, the converted electronic editable form document page of the SVG format, and a control program for controlling editing of the included electronic editable form document page of the SVG format based on the included field attribute information file, and wherein the included field attribute information file is used for editing a field in the included electronic editable form document page of the SVG format; and transmitting the generated data for displaying the browsing screen to a client apparatus.

9. A control method of an information processing system, the control method comprising:

generating an electronic form document page and a field attribute information file by performing an overlay process that uses form information and field data, wherein the form information includes attribute information indicating at least one of information about text position alignment of each field and information about an output format of each field, and wherein a file format of the generated electronic form document page is a PDF format, and wherein the generated field attribute information file includes the attribute information indicating at least one of the information about text position alignment of each field and the information about the output format of each field;

converting the generated electronic form document page into an electronic editable form document page, wherein a file format of the converted electronic editable form document page is an SVG format; and generating data for displaying a browsing screen for browsing and editing the electronic editable form document page of the SVG format, wherein the generated data include the generated field attribute information file, the converted electronic editable form document page of the SVG format, and a control program for controlling editing of the included electronic editable form document page of the SVG format based on the included field attribute information file, and wherein the included field attribute information file is used for editing a field in the included electronic editable form document page of the SVG format.

10. A non-transitory storage medium storing a computer program for causing a computer to execute a control method of an information processing system, the control method comprising:

generating an electronic form document page and a field attribute information file by performing an overlay process that uses form information and field data, wherein the form information includes attribute information indicating at least one of information about text position alignment of each field and information about an output format of each field, and wherein a file format of the generated electronic form document page is a PDF format, and wherein the generated field attribute information file includes the attribute information indicating at least one of the information about text position alignment of each field and the information about the output format of each field;

converting the generated electronic form document page into an electronic editable form document page, wherein a file format of the converted electronic editable form document page is an SVG format; and generating data for displaying a browsing screen for browsing and editing the electronic editable form document page of the SVG format, wherein the generated data include the generated field attribute information file, the converted electronic editable form document page of the SVG format, and a control program for controlling editing of the included electronic editable form document page of the SVG format based on the included field attribute information file, and wherein the included field attribute information file is used for editing a field in the included electronic editable form document of the SVG format.

* * * * *